United States Patent
Zheng et al.

(10) Patent No.: US 10,430,144 B2
(45) Date of Patent: Oct. 1, 2019

(54) MANAGED SCREEN SHARING IN AN ENTERPRISE APPLICATION

(71) Applicant: SugarCRM Inc., Cupertino, CA (US)

(72) Inventors: Xing Zheng, Santa Clara, CA (US); Jelle Vink, Gilroy, CA (US)

(73) Assignee: SUGARCRM INC., Cupertino, CA (US)

( * ) Notice: Subject to any disclaimer, the term of this patent is extended or adjusted under 35 U.S.C. 154(b) by 425 days.

(21) Appl. No.: 14/840,415

(22) Filed: Aug. 31, 2015

(65) Prior Publication Data

US 2017/0060350 A1    Mar. 2, 2017

(51) Int. Cl.
| | |
|---|---|
| *G06F 3/14* | (2006.01) |
| *G06F 9/451* | (2018.01) |
| *H04L 29/06* | (2006.01) |
| *G06F 3/0481* | (2013.01) |
| *G06F 17/21* | (2006.01) |
| *G06F 8/38* | (2018.01) |

(52) U.S. Cl.
CPC .......... *G06F 3/1454* (2013.01); *G06F 3/0481* (2013.01); *G06F 8/38* (2013.01); *G06F 9/452* (2018.02); *G06F 17/211* (2013.01); *H04L 63/101* (2013.01); *H04L 63/104* (2013.01)

(58) Field of Classification Search
CPC ............. H04L 12/1822; H04L 12/1813; H04L 65/403; H04L 63/101; H04L 63/104; H04N 7/15; G06F 3/0481; G06F 3/1454; G06F 8/38; G06F 9/452; G06F 17/211

See application file for complete search history.

(56) References Cited

U.S. PATENT DOCUMENTS

| | | | | |
|---|---|---|---|---|
| 6,308,199 B1* | 10/2001 | Katsurabayashi | .... | G06F 3/0481 709/203 |
| 8,185,828 B2* | 5/2012 | Liu | ........ | G06Q 10/10 715/753 |
| 2002/0165922 A1* | 11/2002 | Wei | .......... | G09B 5/06 709/205 |
| 2006/0075348 A1* | 4/2006 | Xu | ........ | G06F 3/0481 715/730 |
| 2006/0161622 A1* | 7/2006 | Montgomery | ........ | G06F 3/1454 709/204 |
| 2007/0156908 A1* | 7/2007 | Szomolanyi | ........ | H04L 12/1822 709/227 |

(Continued)

*Primary Examiner* — Justin R. Blaufeld

(74) *Attorney, Agent, or Firm* — Steven M. Greenberg, Esq.; Shutts & Bowen LLP

(57) ABSTRACT

Embodiments of the invention provide for managed screen sharing in an enterprise application. In an embodiment of the invention, a method for managed screen sharing in an enterprise application includes loading on behalf of a primary end user an instance of an enterprise application into memory of a computer, directing the instance of the enterprise application to display a screen of data in a display screen of the computer and selecting in the instance of the enterprise application a secondary end user for screen sharing of the screen of data. The method also includes transmitting a request over a computer communications network to a different instance of the enterprise application of the selected end user to display the screen of data in a display screen of the secondary end user. Finally, the method includes displaying the screen of data in the display screen of the secondary end user.

5 Claims, 2 Drawing Sheets

(56) References Cited

U.S. PATENT DOCUMENTS

| | | | |
|---|---|---|---|
| 2008/0126953 A1* | 5/2008 | Davidson | G06Q 10/10 715/753 |
| 2009/0235170 A1* | 9/2009 | Golden | G06F 3/14 715/719 |
| 2010/0005402 A1* | 1/2010 | George | H04L 51/04 715/758 |
| 2010/0131868 A1* | 5/2010 | Chawla | G06F 3/044 715/759 |
| 2010/0262925 A1* | 10/2010 | Liu | G06Q 10/10 715/759 |
| 2011/0225542 A1* | 9/2011 | Schmieder | G06F 3/0481 715/794 |
| 2012/0005588 A1* | 1/2012 | Bastide | G06Q 10/10 715/741 |
| 2012/0005599 A1* | 1/2012 | Bastide | G06Q 10/101 715/753 |
| 2012/0011451 A1* | 1/2012 | Bansal | H04N 7/15 715/753 |
| 2012/0039505 A1* | 2/2012 | Bastide | G06F 3/012 382/103 |
| 2012/0110196 A1* | 5/2012 | Balasaygun | H04L 12/1818 709/228 |
| 2013/0305166 A1* | 11/2013 | Bastide | H04L 65/1069 715/753 |
| 2014/0006971 A1* | 1/2014 | Bell | H04L 65/403 715/753 |
| 2015/0032686 A1 | 1/2015 | Kuchoor | |
| 2016/0147400 A1* | 5/2016 | Patten | G06F 3/0484 715/753 |

* cited by examiner

MANAGED SCREEN SHARING IN AN ENTERPRISE APPLICATION

BACKGROUND OF THE INVENTION

Field of the Invention

The present invention relates to data sharing in an enterprise application and more particularly to screen sharing between different end users over a computer communications network.

Description of the Related Art

Collaborative access to computing is a critical aspect of enterprise data processing. While individualistic computing in which one end user accesses a computing resource singularly is of importance, of greater importance in many circumstances is the ability to two or more end users to collaboratively access computing resources so as to achieve a result more quickly with greater efficiency and accuracy. Classical ways in which end users collaborate in enterprising computing range from the manual joint viewing of a singular computing screen to the more automated screen mirroring in which the display of one end user is provided for viewing to another end user over a computer communications network.

There are many forms of screen mirroring. In one form, screen mirroring is facilitated by remote access software. Application sharing is an element of remote access, falling under the collaborative software umbrella, that enables two or more users to access a shared application or document from their respective computers simultaneously in real time. Generally, the shared application or document will be running on a host computer, and remote access to the shared content will be provided to other users by the host user. Screen mirroring is a more rigid form of application sharing in which the entire display of one user is presented to another user irrespective of which portions of the display are connected to respectively different applications.

Screen mirroring for the purpose of collaborative computing, however, while allowing two end users to absolutely view the content of the screen of one of the end users, is deficient in that modern enterprise computing provides for the granular management of access by different end users to different data and features of an enterprise application. In many enterprise systems, access to features and data of an enterprise application is restricted according to the role of each end user. Yet, screen mirroring allows an end user of a non-permitted role to access a view to data of a permitted role. Yet further, screen mirroring oftentimes requires that the source and target devices are identical in terms of display characteristics. However, oftentimes different modalities of access exist for different users ranging from a mobile phone to a desktop computer. Finally, whereas screen mirroring shows all from the start of a session to the end, in many instances it is desirable to selectively present only portions of a screen during screen mirroring. Thus, screen mirroring is not a practical solution to collaborative computing in an enterprise application.

BRIEF SUMMARY OF THE INVENTION

Embodiments of the present invention address deficiencies of the art in respect to collaborative computing in an enterprise application and provide a novel and non-obvious method, system and computer program product for managed screen sharing in an enterprise application. In an embodiment of the invention, a method for managed screen sharing in an enterprise application includes loading on behalf of a primary end user an instance of an enterprise application into memory of a computer, directing the instance of the enterprise application to display a screen of data in a display screen of the computer and selecting in the instance of the enterprise application a secondary end user for screen sharing of the screen of data. The method also includes transmitting a request over a computer communications network to a different instance of the enterprise application of the selected end user to display the screen of data in a display screen of the secondary end user. Finally, the method includes displaying the screen of data in the display screen of the secondary end user.

In one aspect of the embodiment, the screen of data displayed in the display screen of the secondary end user is filtered to exclude data not permitted to be viewed by the secondary end user according to a role of the secondary end user. In another aspect of the embodiment, the screen of data displayed in the display screen of the secondary end user is formatted to accommodate display characteristics of the display screen of the secondary end user that differ from display characteristics of the display screen of the primary end user. In even yet another aspect of the embodiment, the method includes repeating the directing, selecting, transmitting and displaying for selected different screens of data. Optionally, a report is generated of the selected different screens of data shared with the secondary end user.

In one aspect of the embodiment, the data of the display screen includes a hyperlink referencing a different screen of data. As such, a selection of the hyperlink in the display screen of the primary end user results in the direction of the instance of the enterprise application to display the different screen of data in the display screen of the primary end user, the transmission of a different request over the computer communications network to the different instance of the enterprise application of the selected end user to display the different screen of data in the display screen of the secondary end user, and the display the different screen of data in the display screen of the secondary end user.

In another embodiment of the invention, a data processing system is configured for managed screen sharing in an enterprise application. The system includes a host computing system that has one or more computers, each with memory and at least one processor. The system also includes an application server executing in the host computing system and serving different instances of one or more enterprise applications to each of a primary end user and a secondary end user of the enterprise application. Finally, the system includes a managed screen sharing module coupled to each of the instances of the enterprise application. The module includes program code enabled transmit different requests over a computer communications network from the instance of the enterprise application of the primary end user to the instance of the enterprise application of the secondary end user to display different selected screens of data for display by the primary end user in a display screen of the primary end user, in a display screen of the secondary end user while excluding from display other screens of data selected for display in the display of the primary end user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for managed screen sharing in an enterprise application. In accordance with an embodiment of the invention, a primary end user of an enterprise application directs a display of a screen of data in the enterprise application. Thereafter, the primary end user selects a secondary end user from within the enterprise application to receive a synchronized display of the screen of data. A role of the secondary user is determined. Based upon the role of the secondary end user, data within the screen is filtered to exclude data not permitted for viewing by the role. Finally, a screen of the filtered data is presented to the secondary end user only for so long as the screen of data is displayed to the primary end user. Subsequent screen displays for the primary user are not displayed to the secondary end user unless directed by the primary end user. Optionally, the display of the screen of the filtered data for the secondary user is formatted to accommodate display characteristics of a display device of the secondary user though the display characteristics differ from a display device of the primary user.

Figure 1:
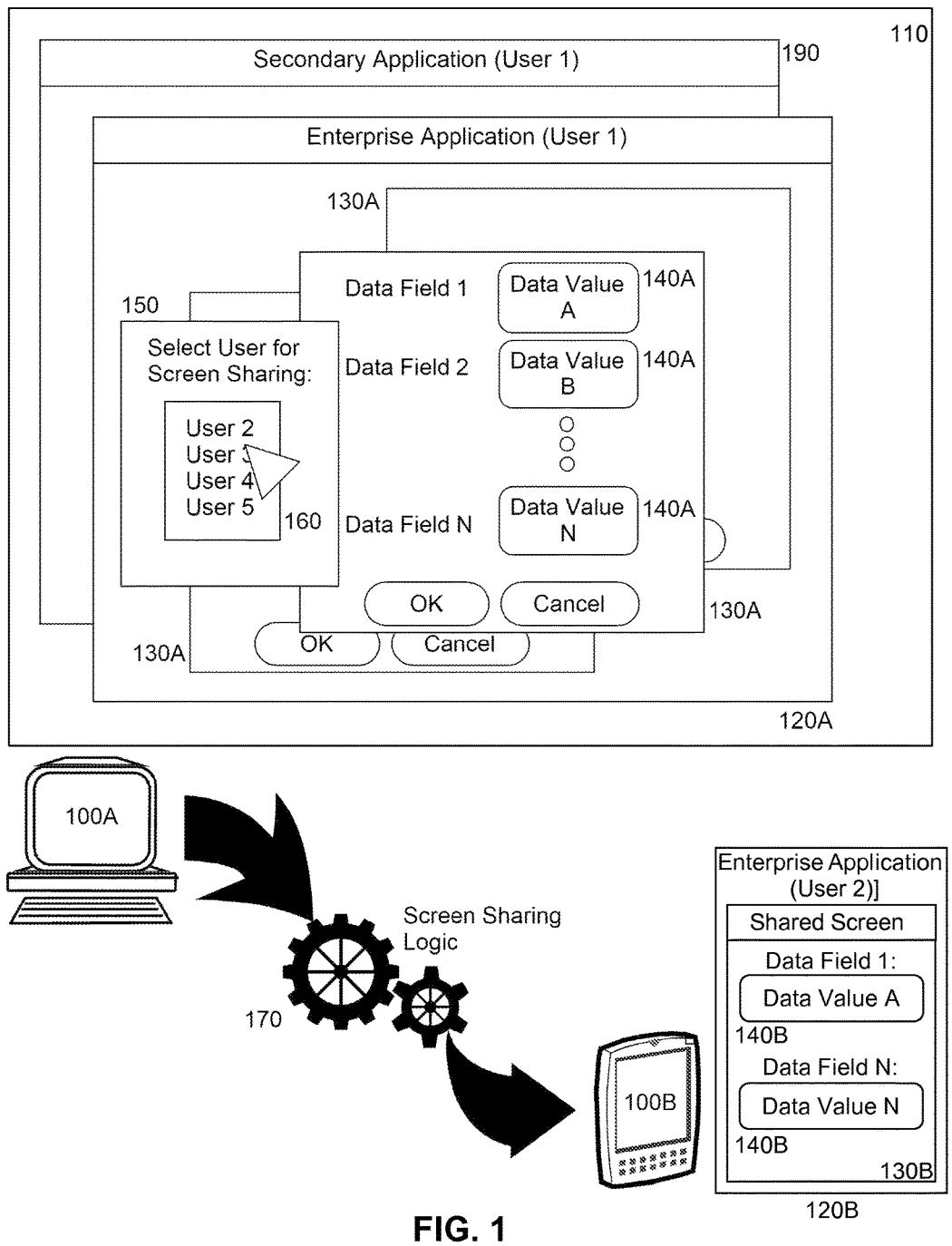
FIG. 1 is a pictorial illustration of a process for managed screen sharing in an enterprise application.

In further illustration, FIG. 1 is a pictorial illustration of a process for managed screen sharing in an enterprise application. As shown in FIG. 1, an application instance 120A of an enterprise application executes in the memory of a computer 100A within an operating system desktop user interface 110 amongst other application instances 190. The computer 100A may range from a desktop computer to a mobile computing device, so long as the computer 100A minimally includes memory, a processor, a display and fixed storage. The application instance 120A generates and displays several different screens 130A of data at the direction of a primary end user. The screens 130A may include different fields of data with corresponding values 140A. The primary end user of the application instance 120A selects one of the screens 130A for sharing with another, secondary end user in response to which a selection 150 of available end users 160 is displayed in the user interface of the application instance 120A. The end user then selects one of the available end users 160.

Screen sharing logic 170 detects the request to share the screen 130A by determining both a role of the selected one of the end users 160 and one or more device characteristics of a computing device 100B of the selected one of the end users 160. Thereafter, the screen sharing logic 170 filters different ones of the data values 140A not permitted for viewing by the determined role from the remaining data values 140A of the selected one of the screens 130A. Further, the screen sharing logic 170 re-arranges the display elements of the selected one of the screens 130A to accommodate the display characteristics of the computing device 100B. Finally, the screen sharing logic 170 transmits the re-formatted screen 130B of the selected one the screens 130A to another instance 120B of the enterprise application in the computing device 100B, with only a subset of the data values 140B for display in the computing device 100, thereby providing managed screen sharing.

Figure 2:
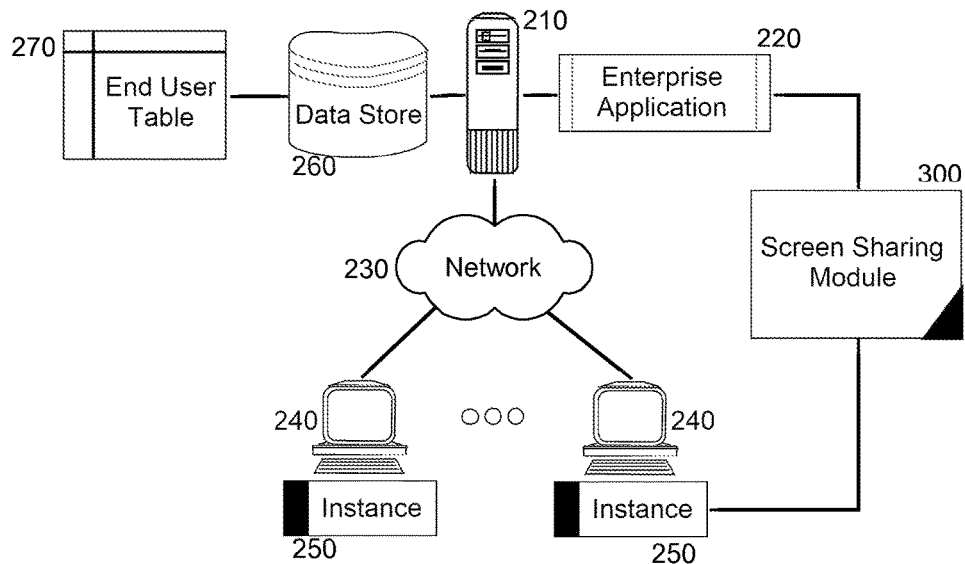
FIG. 2 is a schematic illustration of a data processing system configured for managed screen sharing in an enterprise application; and, FIG. 3 is a flow chart illustrating a process for managed screen sharing in an enterprise application.

The process described in connection with FIG. 1 is implemented in a data processing system. In further illustration, FIG. 2 schematically shows a data processing system configured for managed screen sharing in an enterprise application. The system includes a host computing system 210 that includes one or more computers, each with memory and at least one processor. The host computing system 210 is communicatively coupled to different client computing devices 240 over computer communications network 230 and hosts a deployment of an enterprise application 220 providing access to create, read, modify and delete data in a data store 260. The host computing system 210 further can support the provisioning of different instances 250 of the enterprise application to different end users in each of the computing devices 240. In this regard, the host computing system 210 can maintain a table 270 of the different end users providing information regarding a computing role of each of the different end users, and optionally device characteristics of each of the computing devices 240.

Of import, the system includes a screen sharing module 300 disposed either in the host computing platform 210 or in connection with the host computing platform 210, or both, as part of each of the application instances 250. The module 300 includes program code that when executes in memory of a computer, responds to a request by an authorized primary end user utilizing a corresponding one of the instances 250 to share a selected screen of data generated amongst other screens of data in the instance 250, with a secondary end user utilizing a different one of the instances 250 in a different one of the computing devices 240. Optionally, access to the module 300 is restricted based upon predetermined permissions in the enterprise application 220 for screen sharing.

The response by the program code includes filtering data in the selected screen of data based upon a role of the secondary end user and reformatting the selected screen of data to accommodate the device characteristics of the different one of the computing devices. Optionally, the program code of the module is enabled to produce a report listing each of the generated screens of data of the instance 250 of the primary end user shared by the primary end user with other end users. As another option, the data includes a hyperlink referencing a different screen of data. As such, the when the hyperlink is selected in the selected screen of data, the corresponding one of the instances 250 is directed to display the different screen of data, and the different one of the instances 250 is directed to display the different screen of data.

Figure 3:
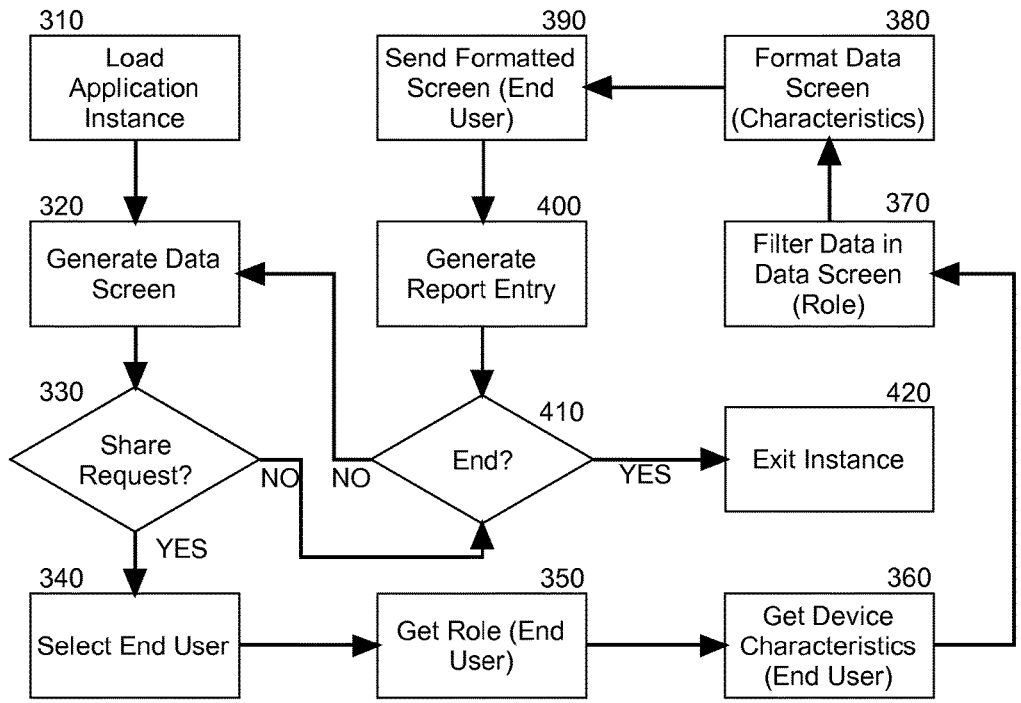

In even further illustration of the operation of the screen sharing module, FIG. 3 is a flow chart illustrating a process for managed screen sharing in an enterprise application. Beginning in block 310, an application instance of an enterprise application is loaded into an operating system desktop of a primary end user amongst other application instances of other applications. In block 320, a screen of data is generated by the application instance and in decision block 330, it is determined if a share request to share the generated screen of data is received. If so, in block 340, an end user with a different application instance is selected and in block 350, a role of the end user is determined, as is, in block 360, device characteristics of a computing device hosting the different application instance.

In block 370, data in the generated screen of data that is not permitted for viewing by an end user with the determined role is filtered from the generated screen and in block 380 the screen of data is formatted to accommodate the determined characteristics of the computing device hosting the different application instance. Finally, in block 390 the formatted screen selected for sharing including only data permitted for viewing by the end user is transmitted to the different application instance for viewing by the end user. Optionally, in block 400, a record of the screen sharing of the screen of data is created. Thereafter, in decision block 410, it can be determined if the application instance is to terminate. If not, the process can repeat in block 320 with the generation of a new screen of data. Otherwise, the application instance can terminate in block 420.

As can be seen from the above description, the approaches to managed screen sharing herein represent significantly more than merely using categories to organize, store and transmit information and organizing information through mathematical correlations. The managed screen sharing technology described herein is in fact an improvement to the technology of screen sharing, since it provides a solution to the problem of inadvertent exposure of data by someone sharing a screen containing data not authorized for viewing by the person with whom the screen is shared. Moreover, the managed screen sharing technology described herein is applied by using a particular machine, namely a system comprising a host computing system coupled by one or more computer networks to different client computing devices. As such, the managed screen sharing technology described herein is confined to screen sharing applications in a networked computer context, and the use of computers is essential to the claims.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for managed screen sharing in an enterprise application, the method comprising:
   loading on behalf of a primary end user an instance of an enterprise application into memory of a computer;
   displaying in a display screen of the computer, a user interface to the instance of the enterprise application;
   directing the instance of the enterprise application to display a first screen of data and a second screen of data, the second screen of data comprising a hyperlink referencing the first screen of data and further comprising multiple different fields of data in the user interface;
   selecting, in the instance of the enterprise application, the second screen for inclusion in a sharing request;
   in response to selecting the second screen for inclusion in a sharing request, presenting a list of secondary end users that are available for sharing irrespective of any secondary end user's computing role;
   selecting, in the instance of the enterprise application, one or more of the secondary end users presented in the list for screen sharing;
   transmitting a package over a computer communications network addressed to a plurality of different instances of the enterprise application loaded into respective memories of computers corresponding to the selected secondary end users, the package comprising the second screen of data and a corresponding request to display the entire second screen of data in a user interface of each different instance;
   intercepting, by screen sharing logic, the package;
   for each of the selected secondary end users, modifying the package by:
      referencing a table of end users providing information regarding the computing role of each of the end users in the table and device characteristics of each computer corresponding to each of the end users,
      determining, the role and device characteristics that correspond to the selected secondary end user,
      determining whether the selected secondary end user's role permits the selected secondary end user to view each field of data in the second screen of data,
      filtering out the fields of data that the selected secondary end user is not permitted to view based on his or her role,
      formatting the remaining fields of data in the second screen of data to accommodate the determined device characteristics that correspond to the selected secondary end user, and
      forwarding the modified packages to the different instances corresponding to the respective selected secondary end users;
   displaying the selected second screen of data comprising the formatted remaining fields and hyperlink referencing the first screen of data in the user interface to the different instance while excluding the fields of data that the secondary end user is not permitted to view based on his or her role from display in the user interface to the different instance;
   creating a record of the screen sharing of the second screen of data;
   making a first determination of whether the instance of the enterprise application is to terminate based on whether or not sharing of an additional screen is requested;
   receiving a selection of the hyperlink referencing the first screen of data at one of the different instances of the enterprise application;
   in response to receiving the selection of the hyperlink:
      resolving the first determination by determining not to terminate the instance of the enterprise application;
      directing the instance of the enterprise application to display the first screen of data,
      transmitting the first screen of data from the instance of the enterprise application to the different instance of the enterprise application where the hyperlink was selected; and
      displaying the first screen of data in the display screen corresponding to the different instance of the enterprise application where the hyperlink was selected
   making a second determination of whether the instance of the enterprise application is to terminate; and
   resolving the second determination by terminating the instance of the enterprise application.

2. The method of claim 1, further comprising repeating the directing, selecting, transmitting and displaying for selected different screens of data.

3. A data processing system configured for managed screen sharing in an enterprise application, the system comprising:
   a host computing system comprising one or more computers, each with memory and at least one processor;
   at least two client computing devices, each with at least one respective memory and processor;
   an application server executing in the host computing system and serving a primary instance of an enterprise application a primary end user of a primary client computing device and a plurality of different, secondary instances of the enterprise application to a plurality of corresponding secondary end users, each of the instances including a user interface displaying multiple different screens of data, with at least the primary instance displaying a first screen of data and a second screen of data, the second screen of data comprising a hyperlink referencing the first screen of data and further comprising multiple different fields of data in the user interface;
   the primary instance configured to:
      receive a selection of the second screen for inclusion in a sharing request;
      in response to receiving the selection of the second screen for inclusion in the sharing request, present a list of secondary end users that are available for sharing irrespective of any secondary end user's computing role;
      receive a selection of one or more secondary end users presented in the list for screen sharing;
      transmit a package over a computer communications network addressed to a plurality of secondary instances of the enterprise application corresponding to the selected secondary end users, the package comprising the second screen of data and a request to display the entire second screen of data in a user interface of each selected secondary instance;

a managed screen sharing module coupled to each of the instances of the enterprise application, the module comprising program code, which, when executed, causes the data processing system to:

intercept the package;

for each of the selected secondary end users, modify the package by:

referencing a table of end users providing information regarding the computing role of each of the end users in the table and device characteristics of each computer corresponding to each of the end users, determine the role and device characteristics that correspond to the selected secondary end user, determine whether the selected secondary end user's role permits the selected secondary end user to view each field of data in the second screen of data, filter out the fields of data that the selected secondary end user is not permitted to view based on his or her role, format the remaining fields of data in the second screen of data to accommodate the determined device characteristics that correspond to the selected secondary end user, and forward the modified packages to the secondary instances corresponding to the respective selected secondary end users; and create a record of the screen sharing of the second screen of data;

the secondary instance configured to:

display the selected second screen of data comprising the formatted remaining fields and hyperlink referencing the first screen of data in the user interface to the different instance while excluding the fields of data that the secondary end user is not permitted to view based on his or her role from display in the user interface to the different instance;

receive a selection of the hyperlink referencing the first screen of data at one of the different instances of the enterprise application;

the primary instance further configured to:

make a first determination of whether the primary instance is to terminate based on whether or not sharing of an additional screen is requested;

in response to receiving the selection of the hyperlink:

resolve the first determination by determining not to terminate the instance of the enterprise application;

display the first screen of data;

transmit the first screen of data to the secondary instance of the enterprise application where the hyperlink was selected; and display the first screen of data in the display screen corresponding to the secondary instance of the enterprise application where the hyperlink was selected;

make a second determination of whether the primary instance of the enterprise application is to terminate; and resolve the second determination by terminating the instance of the enterprise application.

4. A computer program product for managed screen sharing in an enterprise application, the computer program product comprising a computer readable storage medium having program instructions embodied therewith, the program instructions executable by a device to cause the device to perform a method comprising:

loading on behalf of a primary end user an instance of an enterprise application into memory of a computer;

displaying in a display screen of the computer, a user interface to the instance of the enterprise application and directing the instance of the enterprise application to display multiple different screens of data in the user interface;

directing the instance of the enterprise application to display a first screen of data and a second screen of data, the second screen of data comprising a hyperlink referencing the first screen of data and further comprising multiple different fields of data in the user interface;

selecting, in the instance of the enterprise application, the second screen for inclusion in a sharing request;

in response to selecting the second screen for inclusion in a sharing request, presenting a list of secondary end users that are available for sharing irrespective of any secondary end user's computing role;

selecting, in the instance of the enterprise application, one or more of the secondary end users presented in the list for screen sharing;

transmitting a package over a computer communications network addressed to a plurality of different instances of the enterprise application loaded into respective memories of computers corresponding to the selected secondary end users, the package comprising the second screen of data and a corresponding request to display the entire second screen of data in a user interface of each different instance;

intercepting, by screen sharing logic, the package;

for each of the selected secondary end users, modifying the package by:

referencing a table of end users providing information regarding the computing role of each of the end users in the table and device characteristics of each computer corresponding to each of the end users, determining, the role and device characteristics that correspond to the selected secondary end user, determining whether the selected secondary end user's role permits the selected secondary end user to view each field of data in the second screen of data, filtering out the fields of data that the selected secondary end user is not permitted to view based on his or her role, formatting the remaining fields of data in the second screen of data to accommodate the determined device characteristics that correspond to the selected secondary end user, and forwarding the modified packages to the different instances corresponding to the respective selected secondary end users;

displaying the selected second screen of data comprising the formatted remaining fields and hyperlink referencing the first screen of data in the user interface to the different instance while excluding the fields of data that the secondary end user is not permitted to view based on his or her role from display in the user interface to the different instance;

creating a record of the screen sharing of the second screen of data;

making a first determination of whether the instance of the enterprise application is to terminate based on whether or not sharing of an additional screen is requested;
receiving a selection of the hyperlink referencing the first screen of data at one of the different instances of the enterprise application;
in response to receiving the selection of the hyperlink:
  resolving the first determination by determining not to terminate the instance of the enterprise application;
  directing the instance of the enterprise application to display the first screen of data,
  transmitting the first screen of data from the instance of the enterprise application to the different instance of the enterprise application where the hyperlink was selected; and
  displaying the first screen of data in the display screen corresponding to the different instance of the enterprise application where the hyperlink was selected
making a second determination of whether the instance of the enterprise application is to terminate; and
resolving the second determination by terminating the instance of the enterprise application.

5. The computer program product of claim 4, wherein the method further comprises repeating the directing, selecting, transmitting and displaying for selected different screens of data.

* * * * *